(12) United States Patent
Makino et al.

(10) Patent No.: US 11,618,839 B2
(45) Date of Patent: Apr. 4, 2023

(54) STRUCTURE ADHESIVE COMPOSITION EXHIBITING FAVORABLE THREAD BREAKAGE AND CAPABLE OF STITCH COATING

(71) Applicants: CEMEDINE CO., LTD., Tokyo (JP); HONDA MOTOR CO., LTD., Tokyo (JP)

(72) Inventors: Daisuke Makino, Tokyo (JP); Atsuhiko Suzuki, Tokyo (JP); Yuusuke Murachi, Tokyo (JP); Katsutoshi Ando, Saitama (JP); Koji Oda, Tochigi (JP)

(73) Assignees: CEMEDINE CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 1062 days.

(21) Appl. No.: 16/315,788

(22) PCT Filed: Jul. 7, 2017

(86) PCT No.: PCT/JP2017/024959
§ 371 (c)(1),
(2) Date: Jan. 7, 2019

(87) PCT Pub. No.: WO2018/008741
PCT Pub. Date: Jan. 11, 2018

(65) Prior Publication Data
US 2021/0277294 A1    Sep. 9, 2021

(30) Foreign Application Priority Data

Jul. 8, 2016  (JP) .............................. JP2016-135989

(51) Int. Cl.
*C09J 163/00*  (2006.01)
*C09J 5/06*   (2006.01)
*C09J 11/08*  (2006.01)

(52) U.S. Cl.
CPC .............. *C09J 163/00* (2013.01); *C09J 5/06* (2013.01); *C09J 11/08* (2013.01)

(58) Field of Classification Search
None
See application file for complete search history.

(56) References Cited

U.S. PATENT DOCUMENTS

2009/0181250 A1    7/2009  Zmarsly et al.

FOREIGN PATENT DOCUMENTS

| CN | 101643569 | 2/2010 |
|----|-----------|--------|
| JP | 2006-213262 | 8/2006 |

(Continued)

OTHER PUBLICATIONS

International Search Report dated Oct. 10, 2017 in International Application No. PCT/JP2017/024959.

(Continued)

*Primary Examiner* — Jose I Hernandez-Kenney
(74) *Attorney, Agent, or Firm* — Wenderoth, Lind & Ponack, L.L.P.

(57) ABSTRACT

Provided are: a structure adhesive composition which exhibits favorable thread breakage and improves shower resistance, and prevents stringiness when stitch-coating is performed; a method for producing a vehicle structure using the same; and a vehicle structure. A structure adhesive composition exhibiting favorable thread breakage, the structure adhesive composition being a structure adhesive composition containing no liquid rubber component,
the structure adhesive composition contains:
(A) an epoxy resin in which rubber particles are dispersed as primary particles; and
(B) an epoxy resin latent curing agent;
a compounded proportion of the rubber particles in the structure adhesive composition is from 10 to 45 mass %; and (Continued)

a viscosity at 50° C. of the structure adhesive composition is from 190 to 380 (Pa·s) when a shearing speed is 5 (sec$^{-1}$) and is from 1 to 30 (Pa·s) when the shearing speed is 200 (sec$^{-1}$).

1 Claim, 1 Drawing Sheet

(56) References Cited

FOREIGN PATENT DOCUMENTS

| JP | 2006213262 A | * | 8/2006 |
|---|---|---|---|
| JP | 2009-149889 | | 7/2009 |
| JP | 2011-510113 | | 3/2011 |
| JP | 2013-253131 | | 12/2013 |
| JP | 2014-019874 | | 2/2014 |
| JP | 2015-78280 | | 4/2015 |
| JP | 2015-108077 | | 6/2015 |
| JP | 2015108077 A | * | 6/2015 |
| WO | 2004/108825 | | 12/2004 |
| WO | 2017/137386 | | 8/2017 |

OTHER PUBLICATIONS

Notice of Reasons for Refusal dated Apr. 28, 2020 in corresponding Japanese Patent Application No. 2018-526454, with English Translation.

Notice of Reasons for Refusal dated Dec. 20, 2019 in corresponding Japanese Patent Application No. 2018-526454, with English Translation.

Office Action dated Aug. 18, 2020, in corresponding Chinese Patent Application No. 201780040294.2, with English translation.

* cited by examiner

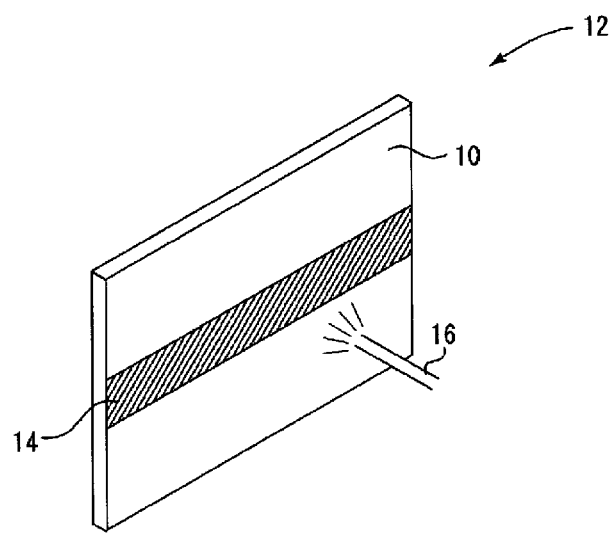

STRUCTURE ADHESIVE COMPOSITION EXHIBITING FAVORABLE THREAD BREAKAGE AND CAPABLE OF STITCH COATING

TECHNICAL FIELD

The present invention relates to a structure adhesive composition used for structural bonding of a body and parts of a vehicle to produce a vehicle structure.

BACKGROUND ART

In the related art, structure adhesive compositions used for joining body panels and body parts of a vehicle to produce a vehicle structure are known.

For example, in the structure adhesive composition disclosed in Patent Document 1, the viscosity at 40° C. is approximately a little under 200 Pa·s. However, with the structure adhesive composition having the viscosity at 40° C. of approximately a little under 200 Pa·s, shower resistance is low, and the structure adhesive composition may be blown away by shower in a shower step in a vehicle production and assembly line. Therefore, known structure adhesive compositions have been used for positions and portions that are less likely to be blown.

Furthermore, when the structure adhesive composition is coated in a vehicle production and assembly line, a known structure adhesive composition containing a rubber component have problems such that an adhesive is attached to an unintended place because the adhesive is stretched out like a string when the adhesive is stitch-coated, and that electrodeposition coating, which is the next step, is adversely affected and thus anticorrosive properties and appearance are deteriorated.

CITATION LIST

Patent Literature

Patent Document 1: JP 2013-253131 A
Patent Document 2: WO 2004/108825 A1

SUMMARY OF INVENTION

Technical Problem

The present invention has been made in view of the problems of the known techniques, aiming to provide: a structure adhesive composition which exhibits favorable thread breakage and improves shower resistance, and prevents stringiness when stitch-coating is performed; a method for producing a vehicle structure using the same; and a vehicle structure.

Solution to Problem

To solve the problems described above, the structure adhesive composition according to an embodiment of the present invention is a structure adhesive composition exhibiting favorable thread breakage and being stitch-coatable, the structure adhesive composition being a structure adhesive composition containing no liquid rubber component, the structure adhesive composition containing: (A) an epoxy resin in which rubber particles are dispersed as primary particles; and (B) an epoxy resin latent curing agent; a compounded proportion of the rubber particles in the structure adhesive composition being from 10 to 45 mass %; and a viscosity at 50° C. of the structure adhesive composition being from 190 to 380 (Pa·s) when a shearing speed is 5 (sec$^{-1}$) and being from 1 to 30 (Pa·s) when the shearing speed is 200 (sec$^{-1}$).

The method of producing a vehicle structure according to an embodiment of the present invention includes a step of stitch-coating the structure adhesive composition described above onto an adherend while being heated at 40 to 60° C. By the step of subjecting an adherend to heating and coating of the structure adhesive composition at 40 to 60° C., the adherend, such as a vehicle body panel or hood, a door, and a fender, can be suitably adhered. The structure adhesive composition according to an embodiment of the present invention can be suitably used in weld-bonding technique (a technique using an adhesive and spot welding in combination).

The vehicle structure according to an embodiment of the present invention is a vehicle structure produced by the production method described above.

Advantageous Effects of Invention

The present invention achieves significant effects that can provide a structure adhesive composition which exhibits favorable thread breakage and is stitch-coatable, improves shower resistance, and prevents stringiness; a method for producing a vehicle structure using the same; and a vehicle structure.

BRIEF DESCRIPTION OF THE DRAWINGS

FIG. 1 is a schematic diagram illustrating the condition of shower resistance test in Examples.

DESCRIPTION OF EMBODIMENTS

Embodiments of the present invention will be described below; however, these embodiments are shown as examples, and it is needless to mention that various modifications are possible as long as such modifications do not deviate from the technical spirit of the present invention.

As described above, the structure adhesive composition exhibiting favorable thread breakage according to an embodiment of the present invention is a structure adhesive composition containing no liquid rubber component, the structure adhesive composition containing: (A) an epoxy resin in which rubber particles are dispersed as primary particles; and (B) an epoxy resin latent curing agent; a compounded proportion of the rubber particles in the structure adhesive composition being from 10 to 45 mass %; and a viscosity at 50° C. of the structure adhesive composition being from 190 to 380 (Pa·s) when a shearing speed is 5 (sec$^{-1}$) and being from 1 to 30 (Pa·s) when the shearing speed is 200 (sec$^{-1}$).

"Containing no liquid rubber component" described above means that the liquid rubber component is not substantially contained. Note that, in the present specification, "liquid rubber" means a rubber having fluidity at room temperature (23° C.) and 1.01×10$^5$ Pa. Furthermore, a liquid rubber-modified epoxy resin is also included in the liquid rubber component.

The epoxy resin in which the rubber particles of the component (A) are dispersed as primary particles is preferably a rubber particle-dispersed epoxy resin in which rubber particles having a number average particle diameter of 10 to 1000 nm are dispersed as primary particles and in which the epoxy equivalent weight is from 500 to 10000. Preferably 1 part by mass to 100 parts by mass of the rubber particles is contained, and from the perspective of sufficiently achieving the effect of the present invention, more preferably from 10 to 50 parts by mass, and even more preferably from 10 to 30 parts by mass, of the rubber particles is contained per 100 parts by mass of the epoxy resin.

Note that the rubber particles being "dispersed as primary particles" means that crosslinked rubber particles having a number average primary particle diameter of preferably from 10 to 1000 nm are each independently dispersed without being aggregated each other in the epoxy resin. The dispersed condition can be confirmed by, for example, dissolving the rubber particle-dispersed epoxy resin into a solvent such as methyl ethyl ketone and then measuring the particle diameter of this by a particle diameter measuring device by laser light scattering or the like, or by observing the rubber particle-dispersed epoxy resin by an electron microscope.

The rubber particles of the component (A) need to be incompatible to each other in the epoxy resin because the effect of the present invention is achieved due to the rubber particles being independently dispersed in the epoxy resin. Therefore, the rubber particle of the component (A) is preferably a particle formed from preferably from 55 to 100 mass %, and more preferably from 60 to 90 mass %, of a core polymer of a crosslinked rubber particle core layer, which is a polymer of monomer for crosslinked rubber particle core layer polymerization and which is present in the inner side of the rubber particle, and preferably from 0 to 45 mass %, and more preferably from 10 to 40 mass %, of a shell polymer of a rigid polymer shell layer, which is a polymer of monomer for rigid polymer shell layer polymerization of vinyl monomer and which is present in the outer side of the rubber particle. The rubber particle is preferably a rubber particle having a core-shell structure having a crosslinked rubber particle core layer and a rigid polymer shell layer. More preferably, the rubber particle is a core-shell rubber particle formed by graft-polymerizing the rigid polymer shell layer onto the crosslinked rubber particle core layer.

From the perspective of effective enhancement of toughness, the number average particle diameter of the rubber particles is from 10 to 1000 nm, preferably from 10 to 600 nm, more preferably from 10 to 500 nm, and even more preferably from 10 to 400 nm. Note that such a number average particle diameter of the rubber particles can be determined by using, for example, dynamic light scattering, electron microscope method, or the like.

The rubber particle of the component (A) is preferably a crosslinked rubber particle. Because the crosslinked rubber particle is crosslinked, the rubber particle contains a solvent-insoluble portion. The amount of the solvent-insoluble substance in the rubber particle (i.e. gel fraction for crosslinked rubber) is represented in terms of mass percent as a proportion of a residual sample mass to a charged sample mass obtained by immersing a sample in an excessive amount of methyl ethyl ketone (MEK) at room temperature for 24 hours, then removing the solvent together with the soluble portion by subjecting this to centrifugal separation at 12000 rpm for 1 hour, and measuring the mass of the residual MEK insoluble substance. The amount of the solvent-insoluble portion in the crosslinked rubber particle is preferably from 80 to 100 mass %, and particularly preferably from 90 to 100 mass %, from the perspective of achieving excellent performance balance.

The rubber particle used in an embodiment of the present invention is preferably a rubber particle having a core-shell structure having a crosslinked rubber particle core layer and a rigid polymer shell layer. From the perspective of enhancement of toughness, the rubber particle is more preferably at least one type selected from the group consisting of butadiene rubber, butadiene-styrene rubber, butadiene butyl acrylate rubber, butyl acrylate rubber, and organosiloxane rubber, and more preferably a graft copolymer having a rigid polymer shell layer obtained by polymerizing at least one type of vinyl monomer in the presence of the crosslinked rubber particle core layer of the butadiene rubber. From the perspective of particle size control, the rubber particle is preferably a rubber particle produced by emulsion polymerization.

The crosslinked rubber particle core layer may be obtained by copolymerizing less than 50% of a component formed from the following vinyl monomers to a degree that does not impair the physical properties of the crosslinked rubber particle core layer.

Examples of the vinyl monomer include aromatic vinyl monomers, such as styrene, α-methyl styrene, p-methyl styrene, or divinylbenzene; vinyl cyanide monomers, such as acrylonitrile or methacrylonitrile; methacrylic acids and methacrylates, such as methyl methacrylate, ethyl methacrylate, butyl methacrylate, glycidyl methacrylate, hydroxyethyl methacrylate, ethylene glycol dimethacrylate, or 1,3-butylene glycol dimethacrylate; and acrylic acids and acrylates, such as methyl acrylate, butyl acrylate, glycidyl acrylate, hydroxy butyl acrylate, or phenoxy ethyl acrylate. A single type of these vinyl monomers may be used, or a mixture of these may be used.

From the perspective of ensuring stable presence of the rubber particles in the composition according to an embodiment of the present invention for a long time period, the rubber particle of the component (A) preferably contains at least one type of group selected from the group consisting of epoxy groups and functional groups that can be reacted with an epoxy group, and more preferably the rigid polymer shell layer contains the group.

From the perspective of enhancement of toughness, the glass transition temperature of the crosslinked rubber particle core layer is preferably 0° C. or lower.

The compounded proportion of the rubber particles of the component (A) to the epoxy resin is preferably from 10 to 45 mass %, and more preferably from 10 to 20 mass %.

As the epoxy resin used in the component (A), an epoxy resin having an epoxy equivalent weight of 80 to 10000 can be used, and an epoxy resin having an epoxy equivalent weight of 80 to 200 is preferable.

Examples of the epoxy resin include glycidyl ether-substituted body of compounds having known basic skeletons, such as bisphenol compounds, hydrogenated bisphenol compounds, phenol or o-cresol novolac, aromatic amines, and polyalicyclic or aromatic compounds, compounds having cyclohexene oxide skeletons, and the like. Representative examples include diglycidyl ethers of bisphenol A, and condensates thereof, i.e. so-called bisphenol A epoxy resins.

Furthermore, as the epoxy resin in which the rubber particles of the component (A) are dispersed as primary particles, for example, an epoxy resin composition described in Patent Document 2 can be used.

As the epoxy resin latent curing agent of the component (B), a publicly known epoxy resin latent curing agent is applicable. For example, a latent curing agent for epoxy resins which is activated by heating, selected from the group consisting of guanamines, guanidines, amino guanidines, ureas, imidazoles, modified polyamines, and derivatives of these, dicyandiamide, boron trifluoride-amine complexes, organic acid hydrazides, melamine, and the like can be used. Among these, dicyandiamide which is widely used is preferable. Note that the added amount of the epoxy resin latent curing agent of the component (B) is decided based on the epoxy equivalent weight of the matrix.

To the structure adhesive composition according to an embodiment of the present invention, epoxy resins, urethane resins, fillers, diluents, silane coupling agents, and the like may be added in addition to the components described above as long as the effect of the present invention is not impaired. Furthermore, in addition to the components described above, extenders (fillers) such as calcium carbonate, barium sulfate, and talc, coloring pigments such as carbon black, titanium oxide, and iron oxide can be added. Furthermore, thixotropic agents such as Ketjenblack, silica, microparticulate calcium carbonate, and sepiolite may be added. Furthermore, an acrylic resin can be added as an adhesion improver to improve adhesion such as peel strength.

In the structure adhesive composition according to an embodiment of the present invention, the viscosity at 50° C. is from 190 to 380 (Pa·s) when the shearing speed is 5 ($sec^{-1}$) and is from 1 to 30 (Pa·s) when the shearing speed is 200 ($sec^{-1}$).

The structure adhesive composition according to an embodiment of the present invention can be particularly suitably used as a one-part type.

The structure adhesive composition according to an embodiment of the present invention is used to produce vehicle structure by adhering structures, such as a vehicle body of a vehicle, parts of vehicle components or the like, and particularly preferably used for adhesion by a technique using an adhesive and spot welding in combination (weld-bonding technique). That is, the structure adhesive composition according to an embodiment of the present invention is suitably used for adhering a vehicle body of a vehicle.

The method of producing a vehicle structure according to an embodiment of the present invention is preferably a production method in a vehicle production line and includes a step of stitch-coating the adhesive composition onto an adherend while being heated at 40 to 60° C. Because discharging performance from nozzles is enhanced by the heating and coating, the heating and coating is preferable for a production line. The method of producing a vehicle structure according to an embodiment of the present invention is preferably a weld-bonding technique. In the weld-bonding technique using an adhesive and spot welding, by allowing the structure adhesive composition according to an embodiment of the present invention to be an adhesive having a large viscosity, shower resistance can be enhanced, thereby making it possible to adhere a portion, to which only spot welding can be applied in the related art, can be bonded by the weld-bonding technique. Therefore, the adhesive can be applied to more portions of vehicle body or the like and toughness can be enhanced, and as a result, the vehicle becomes lighter, which leads to enhancement of fuel economy. Furthermore, in the related art, it was difficult to achieve good shower performance and stringiness when stitch coating is performed in a compatible manner; however, the structure adhesive composition according to an embodiment of the present invention enabled achievement of these in a compatible manner.

Because the structure adhesive composition according to an embodiment of the present invention has high shower resistance and excellent thread breakage, when the structure adhesive composition is used in a vehicle production line, stitch coating can be employed, and excellent workability is achieved. "Stitch coating" refers to intermittent coating of an adhesive. Coating of adhesive while portions to which spot welding is performed are avoided can be performed by employing the stitch coating in the weld-bonding technique, and thus effects of suppressing generation of combustion gas, such as carbon dioxide and smoke caused by combustion of the adhesive, and reduction of the used amount of the adhesive can be achieved. The structure adhesive composition according to an embodiment of the present invention can be used at a coating rate of 500 mm/min by a coating gun. In the method of producing a vehicle structure according to an embodiment of the present invention, the coating is preferably performed by a robot hand.

EXAMPLES

The present invention will be further specifically described below using examples; however, these examples are set forth to illustrate the present invention, and the scope of the present invention is not limited thereto.

Examples 1 and 2 and Comparative Examples 1 to 3

Using the parts by mass of each component shown in in Table 1 below, structure adhesive compositions were produced according to the procedures described below. Each material was blended in a 5 L planetary mixer (available from Dalton Corporation) and agitated for 30 minutes, and then defoamed under reduced pressure for 10 minutes to prepare a structure adhesive composition.

TABLE 1

|  | Example 1 mass % | Example 2 mass % | Comparative Example 1 mass % | Comparative Example 2 mass % | Comparative Example 3 mass % |
| --- | --- | --- | --- | --- | --- |
| (B) Epoxy resin latent curing agent *1 | 5.2% | 5.2% | 5.2% | 5.2% | 5.2% |
| Curing accelerator *2 | 2.0% | 2.0% | 2.0% | 2.0% | 2.0% |
| Filler *3 | 6.7% | 6.7% | 6.7% | 6.7% | 6.7% |
| Filler *4 | 10.8% | 10.8% | 10.8% | 10.8% | 10.8% |
| Thixotropic material *5 | 3.3% | 3.3% | 3.3% | 3.3% | 3.3% |
| Epoxy resin *6 | 21.3% | 21.3% | 51.8% | 51.8% | 46.7% |
| (A) Rubber particle-dispersed epoxy resin *7 | 50.8% | — | — | — | 25.5% |

TABLE 1-continued

|  | Example 1 mass % | Example 2 mass % | Comparative Example 1 mass % | Comparative Example 2 mass % | Comparative Example 3 mass % |
|---|---|---|---|---|---|
| (A) Rubber particle-dispersed epoxy resin *8 | — | 50.8% | — | — | — |
| Liquid rubber *9 | — | — | 20.3% | — | — |
| Rubber particle *10 | — | — | — | 20.3% | — |
| Total | 100.0% | 100.0% | 100.0% | 100.0% | 100.0% |
| (Among this, content of rubber particle) | (20.3%) | (12.7%) |  |  | (9.3%) |

The raw materials in Table 1 are as described below.
*1) "DYHARD 100SH" Dicyandiamide available from AlzChem Group AG
*2) "EPICLON B605-IM" Diuron available from DIC Corporation
*3) "CCR" Surface-treated calcium carbonate available from Shiraishi Kogyo Kaisha, Ltd.
*4) "NN500" Calcium carbonate available from Nitto Funka Kogyo K.K
*5) "TS-720" Silica available from Cabot Japan K.K.
*6) "DER331" Bisphenol A liquid epoxy resin available from Dow Chemical Japan Limited
*7) "KANE ACE MX154" Epoxy resin in which a core-shell rubber is uniformly dispersed available from Kaneka Corporation (compounded amount of rubber particles: 40 mass %)
*8) "KANE ACE MX960" Epoxy resin in which a core-shell rubber is uniformly dispersed available from Kaneka Corporation (compounded amount of rubber particles: 25 mass %)
*9) "Nipol DN601" Liquid nitrile rubber available from Zeon Corporation
*10) "KANE ACE B562" Butadiene rubber particles available from Kaneka Corporation Each of the adhesive compositions of Examples 1 and 2 and Comparative Examples 1 to 3 produced as described above was subjected to a performance test described below, and the results are shown in Table 2 below.

(1) Shear Strength

Two cold-rolled steel sheets having 100 mm length×25 mm width×1.6 mm thickness were prepared. The obtained adhesive composition was coated on the cold-rolled steel sheets so that the coating thickness was 0.1 mm, and the two cold-rolled steel sheets were overlapped so that the overlapped portion was 12.5 mm, and the excess adhesive that came out from the overlapped portion was removed. In this manner, a shearing test piece was produced. The shearing test piece was placed in a drier at 170° C. for 30 minutes to be baked, allowed to cool for 24 hours, and then subjected to testing at a tensile test speed of 50 mm/min by using a universal tensile tester. The sample having a shear strength of 20 MPa or greater was evaluated as "Good", and the sample having a shear strength of less than 20 MPa was evaluated as "Poor".

(2) Viscosity

The viscosities at 50° C. of the obtained adhesive composition at the time when the shearing speed was 5 (sec$^{-1}$) and when the shearing speed was 200 (sec$^{-1}$) were determined by using the RST-CPS, available from Brookfield, equipped with a heating device and sensor system and the like.

(3) Thread Breakage

A syringe (Terumo syringe; code number: SS-10SZ; volume: 10 mL; medium) to which the obtained adhesive composition was charged was fixed in the condition where the syringe was 1 mm away from a steel sheet and was discharging 3 mL of the adhesive composition. Thereafter, the steel sheet was lowered for 300 mm at a rate of 300 mm/sec, and the length of the string of the structure adhesive composition from the discharging opening of the syringe was measured by using vernier calipers. The case where the length of the string was 5 mm or less was evaluated as "Good", and the case where the length of the string was greater than 5 mm was evaluated as "Poor".

(4) Shower Resistance

The obtained adhesive composition was coated on a steel sheet 10 in a semicircular bead shape with a width of 3 mm as illustrated in FIG. 1 and used as a test piece 12. In FIG. 1, the reference sign 10 is the steel sheet, the reference sign 14 is the adhesive composition, and the reference sign 16 is a shower nozzle. The nozzle "½ MVVP65350B (available from H. Ikeuchi & Co., Ltd.)" was connected to a pump, and shower was applied for the test piece 12 for 10 seconds under the condition where the warm water at 40° C. was perpendicularly applied to the test piece 12 at a water pressure of 0.15 MPa as illustrated in FIG. 1. The distance between the shower nozzle 16 and the test piece 12 was 350 mm. The case where the bead shape was maintained after the shower was evaluated as "Good", and the case where the bead shape was broken was evaluated as "Poor".

TABLE 2

|  | Example 1 | Example 2 | Comparative Example 1 | Comparative Example 2 | Comparative Example 3 |
|---|---|---|---|---|---|
| Shear strength (MPa) | 27.3 | 22.1 | 22.8 | 21.8 | 27.0 |
| Shear strength determination | Good | Good | Good | Good | Good |
| Viscosity when shearing speed was 5 (s$^{-1}$) (Pa · s) | 191 | 199 | 89 | 98 | 111 |
| Viscosity when shearing speed was 200 (s$^{-1}$) (Pa · s) | 15 | 16 | 31 | 5 | 6 |
| Thread breakage | Good | Good | Poor | Good | Good |
| Shower resistance | Good | Good | Poor | Poor | Poor |

In Examples 1 and 2, both the shower resistance and the thread breakage exhibited good results. However, in Comparative Examples 1 to 3, either one or both of the shower resistance and the thread breakage exhibited poor result(s).

REFERENCE SIGNS LIST

10 Steel sheet
12 Test piece
14 Adhesive composition
16 Shower nozzle

The invention claimed is:

1. A method for producing a vehicle structure, the method comprising:
   stitch-coating a structure adhesive composition containing no liquid rubber component onto an adherend to produce the vehicle structure,
   wherein the adherend is heated at 40 to 60° C., and
   wherein the structure adhesive composition comprises:
   (A) an epoxy resin in which rubber particles are dispersed as primary particles; and
   (B) an epoxy resin latent curing agent;
      wherein a compounded proportion of the rubber particles in the structure adhesive composition is from 10 to 45 mass %; and
      wherein a viscosity at 50° C. of the structure adhesive composition is from 190 to 380 (Pa·s) when a shearing speed is 5 (sec$^{-1}$) and is from 1 to 30 (Pa·s) when the shearing speed is 200 (sec$^{-1}$).

\* \* \* \* \*